No. 622,764. Patented Apr. 11, 1899.
S. M. FORD.
AXLE NUT.
(Application filed Mar. 29, 1898.)
(No Model.)
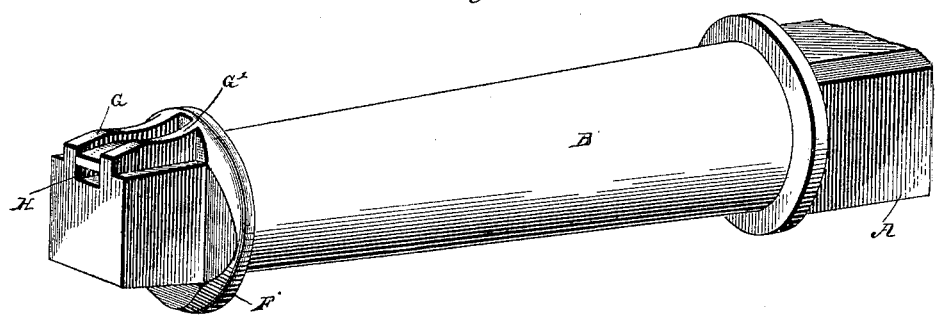
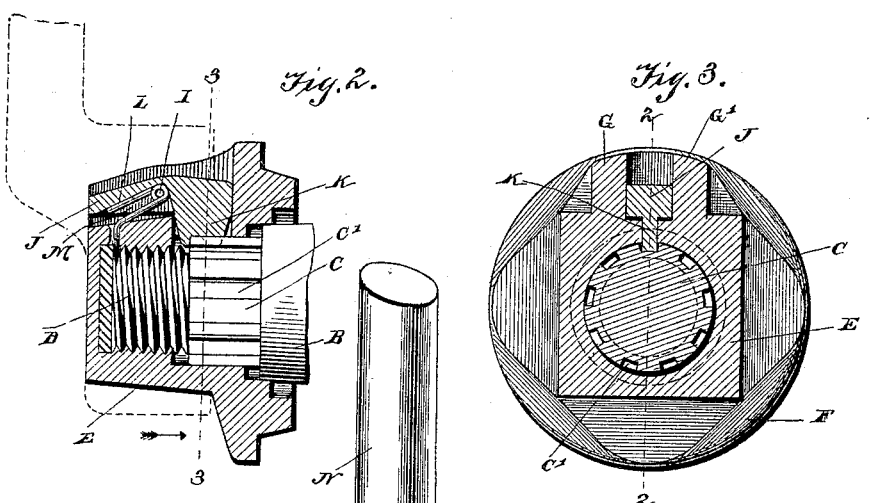
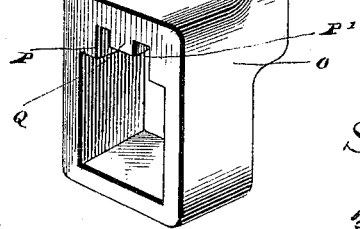
Witnesses
W. C. Linsfrey.
Chas. E. Brock.
Inventor
Samuel M. Ford.
by O'Mara & Co.
Attorneys

UNITED STATES PATENT OFFICE.

SAMUEL M. FORD, OF FLORA, ILLINOIS.

AXLE-NUT.

SPECIFICATION forming part of Letters Patent No. 622,764, dated April 11, 1899.

Application filed March 29, 1898. Serial No. 675,612. (No model.)

*To all whom it may concern:*

Be it known that I, SAMUEL M. FORD, a citizen of the United States, residing at Flora, in the county of Clay and State of Illinois, have invented a new and useful Axle-Nut, of which the following is a specification.

My invention relates to nuts for the axles of wagons, carriages, and other vehicles; and the object of my invention is to provide such nuts with means for preventing their accidental turning and removal from the spindle of the axle, whereby the wheel might be run off, such means being specially constructed, whereby the nut may be removed from the spindle with my improved wrench without the use of any other tool.

With this object in view my invention consists in a nut for vehicle-axles provided with the usual angular body and inner flange and with means for locking it upon the spindle, such means comprising a spring-actuated pawl located between two longitudinal flanges on one side of the nut and held normally in engagement with one of a series of longitudinal grooves in the spindle.

My invention further consists in the improved construction, arrangement, and combination of parts hereinafter fully described and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Figure 1 is a perspective view illustrating one end of an ordinary axle and its spindle with my improved axle-nut applied thereto. Fig. 2 is a vertical sectional view on the line 2 2 of Fig. 3. Fig. 3 is a transverse vertical sectional view on the line 3 3 of Fig. 2. Fig. 4 is a detail perspective view of a wrench to be used with my improved axle-nut.

Like letters of reference mark the same parts wherever they occur in the different figures of the drawings.

Referring to the drawings by letters, A indicates an ordinary metal axle provided with the spindle B, upon which the wheel rotates, said spindle being provided beyond its smooth portion with a reduced section C, provided with longitudinal grooves C', the outer end of the spindle being still further reduced and provided with a screw-thread, as shown at D in Fig. 2.

E indicates the nut, which is provided with an interior thread to engage the threaded end B of the spindle and with the usual annular flange F, upon which the outer end of the hub of the wheel has its bearing when in position upon the spindle. Upon one side of the square portion of the nut are formed two parallel longitudinal flanges G and G', extending from the outer side of the annular flange F to the outer end of the nut, the space H between these flanges extending inward and a portion thereof extending from the inner end of the nut to about its mid-length, being cut through to the spindle, forming a slot in the base of the groove or space H. Pivoted between the two flanges G and G' by means of a pin or screw I is a dog or pawl J, with a narrow tongue K, which passes through the slot before referred to and engages one of the series of grooves C' in the reduced portion of the spindle C, the tongue being held normally in engagement in said groove by means of a spring L, seated in a recess M in the inside of the pawl J, said spring being coiled around the pin I and having an upward bearing against the inner wall of the recess M and a lower bearing in a small hole in the bottom of the recess M. The normal position of the outer end of the pawl J, when the tongue K is engaged in one of the grooves C' is at a slight distance from the bottom of the recess M, leaving space to press the outer end inward to raise the tongue out of the groove.

In Fig. 4 I have illustrated a wrench adapted to be used with a nut constructed in accordance with my invention, said wrench consisting of a handle N and a head O, the head projecting laterally beyond the inner space of the handle when the wrench is in position on the nut, so that the handle will be free to turn. The head O is provided with a recess to fit over the nut, the main portion thereof being square in contour, one side of the square being provided with recesses P and P', to fit over the flanges G and G' of the nut, forming between them a flange Q to fit between the flanges G and G' of the nut to operate the pawl, as hereinafter described.

The construction of my invention will be readily understood from the foregoing description and its operation may be described as follows: The nut being in position upon the spindle, as illustrated in Figs. 1, 2, and 3 of the drawings, the wrench is placed over it, as shown in dotted lines in Fig. 2. In doing this the recesses or grooves P and P' in the wrench ride over the flanges G and G' of the nut, the flange or rib Q between them pressing upon the outer end of the pawl J and raising the tongue K on the forward end of the pawl J out of the grooves C' of the spindle, in which it has been resting. This leaves the nut free to be turned off by means of the wrench, and when the nut is entirely removed from the spindle the pressure outward of the outer end of the pawl J upon the inside of the rib Q of the wrench will be sufficient to hold the nut in the wrench until the spindle has been greased, when the nut can again be placed upon the end of the spindle without touching it with the hands, the rib Q holding the pawl out of engagement with the groove C' of the spindle until the nut has been screwed home and the wrench removed therefrom, when the spring will force the tongue of the pawl into one of the grooves C', thus securely locking the nut against being turned off accidentally or with an ordinary wrench.

While my improved spindle, nut, and wrench will generally be sold together, still each of them may be sold separate as an article of manufacture in order to supply a want for either occasioned by breakage or loss.

Having thus fully described my invention, what I claim as new, and desire to secure by Letters Patent of the United States, is—

1. The herein-described axle-nut provided with two longitudinal ribs or flanges raised upon one side, a slot being formed in the bottom of the recess between said flanges and an opening in the bottom of the hole in front of the slot, a pawl pivoted between said flanges, provided with a recess or chamber in its under side and a tongue on its inner end, and a spring located in the recess in the pawl, coiled around its pivot, and having one end seated in the hole in the bottom of the space between the nut-flange, the tendency of said spring being to normally hold the tongue of the pawl in its inner position to engage one of a series of longitudinal grooves formed on the spindle, substantially as described.

2. The combination with an axle-spindle provided with a reduced portion beyond the bearing-surface, having a series of longitudinal grooves in its surface, and a further reduced screw-threaded end, of a nut threaded to engage the threaded end of the spindle, having two longitudinal ribs or flanges from one side of its angular head, a slot being formed in the bottom of the space between said ribs or flanges, reaching through the shell of the nut and a hole outside of the slot, a pawl pivoted in the space between the flanges, provided with a recess in its under surface and a tongue at its inner end, projecting through the nut-slot, and a spring in the recess in the pawl coiled around its pivot and having one end secured in the hole in the nut-space, the normal tendency of said spring being to force the pawl-tongue into engagement with the grooves in the spindle, substantially as described.

SAMUEL M. FORD.

Witnesses:
MORTON S. DICKERSON,
ISRAEL STEPHENS.